United States Patent [19]

Bell

[11] Patent Number: 5,451,309
[45] Date of Patent: Sep. 19, 1995

[54] ION EXCHANGE RESIN REGENERATION APPARATUS

[75] Inventor: Merl J. Bell, Bedford, Va.

[73] Assignee: B&W Nuclear Technologies, Inc., Lynchburg, Va.

[21] Appl. No.: 239,484

[22] Filed: May 9, 1994

[51] Int. Cl.⁶ ............................................ B01D 61/44
[52] U.S. Cl. ................................. 204/301; 204/131; 204/182.4; 210/670; 210/675
[58] Field of Search ..................... 204/182.4, 131, 301; 210/670, 675

[56] References Cited

U.S. PATENT DOCUMENTS

| | | | |
|---|---|---|---|
| 2,763,607 | 9/1956 | Staverman | 204/131 |
| 4,687,561 | 8/1987 | Kunz | 204/182.5 |
| 4,909,916 | 3/1990 | Koberstein et al. | 204/182.6 |

*Primary Examiner*—John Niebling
*Assistant Examiner*—Arun S. Phasge
*Attorney, Agent, or Firm*—Robert J. Edwards; D. Neil LaHaye

[57] ABSTRACT

An ion exchange resin regeneration apparatus. A nine compartment module has two end anode electrode compartments and a center cathode electrode compartment. These three compartments contain a mixture of cation and anion resin. The two end compartments are lined by cation membranes while the center compartment is lined on both sides by anion membranes. All but two of the remaining compartments are provided with cation or anion exchange resin and opposing cation and anion membranes in an arrangement whereby a resin slurry may be consecutively directed through two of the compartments for processing.

3 Claims, 1 Drawing Sheet

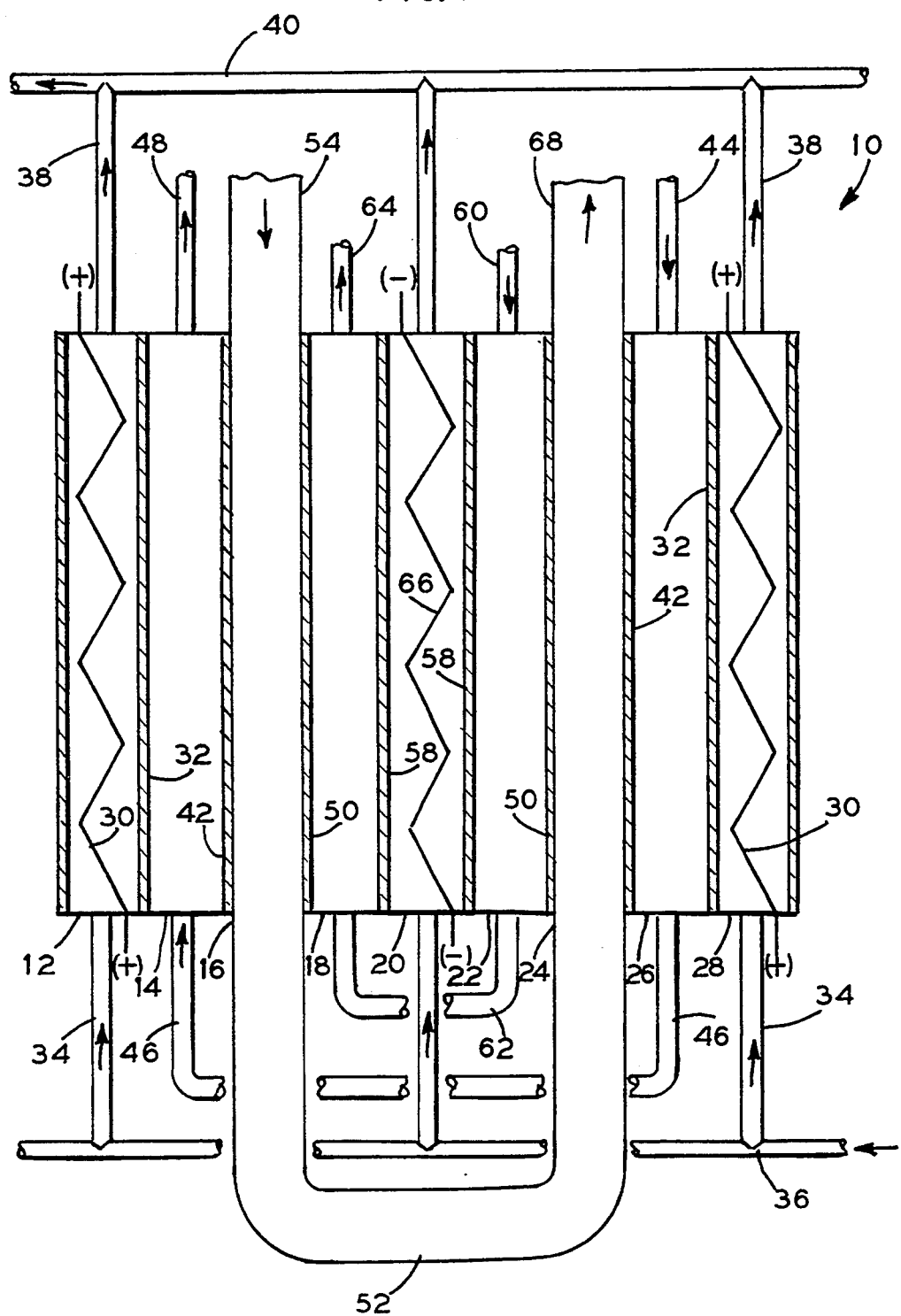

ION EXCHANGE RESIN REGENERATION APPARATUS

BACKGROUND OF THE INVENTION

1. Field of the Invention

The invention is generally related to ion exchange resins and particularly to the regeneration of ion exchange resins.

2. General Background

Many industries, including the nuclear industry, have a need to remove impurities from solutions. A process that is commonly used is based on adsorption-desorption involving an exchange of ions between the solution and an insoluble resin. Eventually, the ion exchange capability of the insoluble resin is exhausted. The ion resin may then be treated to remove the contaminant ions and replace them with ions useful in treatment processes. Regeneration of the ion resins for multiple use helps to reduce the cost of such operations. Patents directed to treatment with ion exchange resins or regeneration of ion exchange resins that applicant is aware of include the following.

U.S. Pat. No. 3,663,417 discloses an electrodialytic apparatus that utilizes at least one two-chamber cell for purification and at least one three-chamber cell proximal the two-chamber unit for concentration of aqueous per(halo-oxygen) acids and their salts.

U.S. Pat. No. 4,149,946 is directed to the recovery of spent pickle liquor and iron metal and discloses a cathode chamber immediately between two anode chambers.

U.S. Pat. No. 4,177,119 discloses a process for the recovery of waste HCl from an aqueous metal pickling solution which contains large amounts of Fe ions.

U.S. Pat. No. 3,686,089 discloses a method of separation of ions from a solution by an electrolytic process.

U.S. Pat. No. 5,211,823 discloses a process for the purification of resin using a bi-polar interface.

U.S. Pat. No. 2,758,083 discloses a multicell electrodialysis apparatus.

U.S. Pat. Nos. 3,244,763; 3,397,141; 4,306,946; and 4,787,946 are generally representative of the art.

Much of the known art requires a large amount of electrical power and/or chemicals.

SUMMARY OF THE INVENTION

The invention addresses the need for more efficient ion exchange resin regeneration. What is provided is a compartment module for regeneration of an ion exchange resin slurry. A basic module contains nine compartments where the two end compartments and the center compartment are the electrode compartments. The two end compartments are the electrical anodes and the center compartment is the electrical cathode. These three compartments contain a mixture of cation and anion resin. The two end compartments are lined on one side by cation membranes while the center compartment is lined on both sides by anion membranes. All but two of the remaining compartments are provided with cation or anion exchange resin and opposing cation and anion membranes in an arrangement whereby a resin slurry may be consecutively directed through two of the compartments for processing.

BRIEF DESCRIPTION OF THE DRAWINGS

For a further understanding of the nature and objects of the present invention reference should be had to the following description, taken in conjunction with the accompanying drawing in which like parts are given like reference numerals, and wherein the single drawing is a sectional schematic view of the invention.

DETAILED DESCRIPTION OF THE PREFERRED EMBODIMENT

Referring to the drawing, it is seen that the invention is generally indicated by the numeral 10. Resin regeneration apparatus 10 is generally comprised of first anode electrode compartment 12, first anolyte compartment 14, first resin process compartment 16, first catholyte compartment 18, cathode electrode compartment 20, second catholyte compartment 22, second resin process compartment 24, second anolyte compartment 26, and second anode electrode compartment 28.

First and second anode electrode compartments 12, 28 each have an electrode 30 therein that receives a positive charge during operation. Each compartment 12, 28 is also filled with a mixture of cation and anion resin to provide an electrolytic conductor for the applied charge. Each compartment 12, 28 has its inner surface formed from first cation membrane 32, 33. The cation membrane has the characteristic of allowing cations(positively charged ions) to pass through it while restricting the passage of anions(negatively charged ions). When apparatus 10 is used as a single module, the outer surface or boundary of each compartment is formed from a solid plate that is nonpermeable to liquid or the ions being filtered. Each compartment 12, 28 has a fluid inlet 34 that receives fluid from first water line 36 and a fluid outlet 38 at the opposite end that direct the discharged fluid into first fluid discharge line 40. The preferred arrangement provides for parallel fluid flow through compartments 12, 28.

First and second anolyte compartments 14, 26 each share a common cation membrane 32 with their adjacent anode electrode compartments 12, 28. The opposite side of compartments 14, 26 are defined by first anion membranes 42. The anion membrane allows anions to pass freely while restricting the passage of cations. Second anolyte compartment 26 receives high purity water from fluid line 44 and discharges the fluid into line 46 which serves as an outlet for compartment 26 and a fluid inlet for compartment 14. First anolyte compartment 14 is provided with fluid outlet line 48 at the opposite end of inlet line 46. The preferred arrangement provides for opposite fluid flow through compartments 14, 26. Compartments 14, 26 are each filled with anion exchange material which has the ability to exchange negatively charged anions for others of like(-negative) charge although the charges may be the same or different in value.

First and second resin process compartments 16, 24 each share a common anion membrane 42 with their respective adjacent anolyte compartments. The opposite sides of compartments 16, 24 are defined by second cation membranes 50. Compartments 16, 24 are in fluid communication via line 52 such that the resin slurry being processed enters one end of compartment 16 via inlet 54, exits the opposite end into line 52, enters compartment 24 at the same relative end as the exit end of compartment 16, and exits compartment 24 via outlet 56. This provides for a countercurrent flow through compartments 16, 24 relative to each other and the flow direction in compartments 14, 26.

First and second catholyte compartments 18, 22 each share a common cation membrane 50 with their respective adjacent resin process compartments. The opposite sides of compartments 18, 22 are defined by second anion membranes 58. Fluid flow through compartments 18, 22 is in the same pattern as that in compartments 14, 26. Fluid enters second catholyte compartment 22 via inlet line 60 and exits via line 62 which serves as the inlet line for first catholyte compartment 18. Fluid exits compartment 18 via exit line 64 at the opposite end of the compartment. Compartments 18, 22 are each filled with cation exchange material which has the ability to exchange positively charged ions for others of like charge(positive) although the charges may be the same or different in value.

Cathode electrode compartment 20 is defined by the spaced apart second anion membranes 58 of catholyte compartments 18, 22. Cathode electrode compartment 20 has an electrode 66 therein that receives a negative charge during operation. Compartment 20 is filled with a mixture of cation and anion resin to provide an electrolytic conductor for the applied charge.

In operation, a slurry of ion exchange resin that has been fully or partially exhausted or partially regenerated is directed into first resin process compartment 16. The positive charge applied to first and second anode electrode compartments 12, 28 carries over to first and second anolyte compartments 14, 26 and causes negatively charged ions(anions) to migrate from the process resin in compartments 16, 24 across first common anion membranes 42 to anolyte compartments 14, 26. Hydroxyl ions(OH) created in compartments 14, 26 by the electrical charge on the water flowing therethrough replace the anions that have been removed from the process resin. This results in regeneration of the process resin with useful anions. A continual or pulsed flow of relatively high purity water through compartments 14, 26 may be used to flush out the anions released from the resin and insure the availability of hydroxyl ions for the exchange process. Typical anions that would be removed from the resin would include but are not limited to chloride, sulfate, and nitrate. Similarly, the negative charge in compartment 20 carries over to catholyte compartments 18, 22 and causes negatively charged ions(cations) to be released from the process resin in compartments 16, 24 and migrate across second common cation membranes 50 into catholyte compartments 18, 22. Hydrogen(H+) or hydronium($H_3O^+$) ions created by the negative charge on water flowing through compartments 18, 22 replaces the removed cations in the resin. This results in the regeneration of the resin with useful cations. A continual or pulsed flow of relatively high purity water through compartments 14, 26 may be used to flush out the cations released from the resin and insure the availability of hydrogen or hydronium ions for the exchange process. Typical cations that would be removed from the resin would include but are not limited to sodium, potassium, etc. These cations and anions are removed from the process resin and the processed resin is discharged from second resin process compartment 24 at outlet 56 in a more fully regenerated condition than when it was introduced into the apparatus. The product anion 64 and cation 48 streams may be sent to waste or sent to purification facilities for recovery of the cations and/or anions produced. The invention provides the advantage of the regeneration of resin with a use of less regeneration chemicals(sodium and sulfate) than can be obtained with normal regeneration techniques without special resin separation hardware and/or techniques and specially prepared and selected particle size resin. In the event that the application requires the use of more than one nine-compartment module, the first and second anode electrode compartments may be provided with a cation membrane on their outer boundaries to allow a number of modules to be used together. In such a case, an anolyte compartment would be placed adjacent the anode electrode compartments to eliminate the need for the separate anode electrode compartments that would be required if the modules were used separately.

What is claimed as invention is:

1. An apparatus for regeneration of an ion exchange resin, comprising:
   a. a first anode electrode compartment lined with a cation selective membrane and containing a mixture of cation and anion resin;
   b. a first anolyte compartment adjacent said first anode electrode compartment having a common cation selective membrane with said first anode electrode compartment and having an anion selective membrane opposite the cation membrane and containing anion exchange material;
   c. a first resin process compartment adjacent said first anolyte compartment having a common anion selective membrane with said first anolyte compartment and having a cation selective membrane opposite the anion membrane;
   d. a first catholyte compartment adjacent said first resin process compartment having a common cation membrane with said first resin process compartment and having an anion selective membrane opposite the cation membrane and containing cation exchange material;
   e. a cathode electrode compartment adjacent said first catholyte compartment having a common anion membrane with said first resin process compartment and having a second anion selective membrane opposite the common anion membrane;
   f. a second catholyte compartment in fluid communication with said first catholyte compartment adjacent said cathode electrode compartment having a common anion membrane with said cathode electrode compartment and having a cation selective membrane opposite the anion membrane and containing cation exchange material;
   g. a second resin process compartment in fluid communication with said first resin process compartment adjacent said second catholyte compartment having a common cation membrane with said second catholyte compartment and having an anion selective membrane opposite the cation membrane;
   h. a second anolyte compartment adjacent said second resin process compartment having a common anion membrane with said second resin process compartment and having a cation selective membrane opposite the anion membrane and containing anion exchange material; and
   i. a second anode electrode compartment having a common anion membrane with said second anolyte compartment and containing a mixture of cation and anion resin.

2. The apparatus of claim 1, wherein each of said resin process compartments are arranged for counter current flow relative to their respective adjacent compartments.

3. The apparatus of claim 1, wherein said anode electrode compartments, said second catholyte compartment, and said second anolyte compartment are attached to separate water supplies.

* * * * *